F. A. HOLMES.
TRACTOR FENDER.
APPLICATION FILED APR. 3, 1919.
1,405,216.
Patented Jan. 31, 1922.
2 SHEETS—SHEET 1.
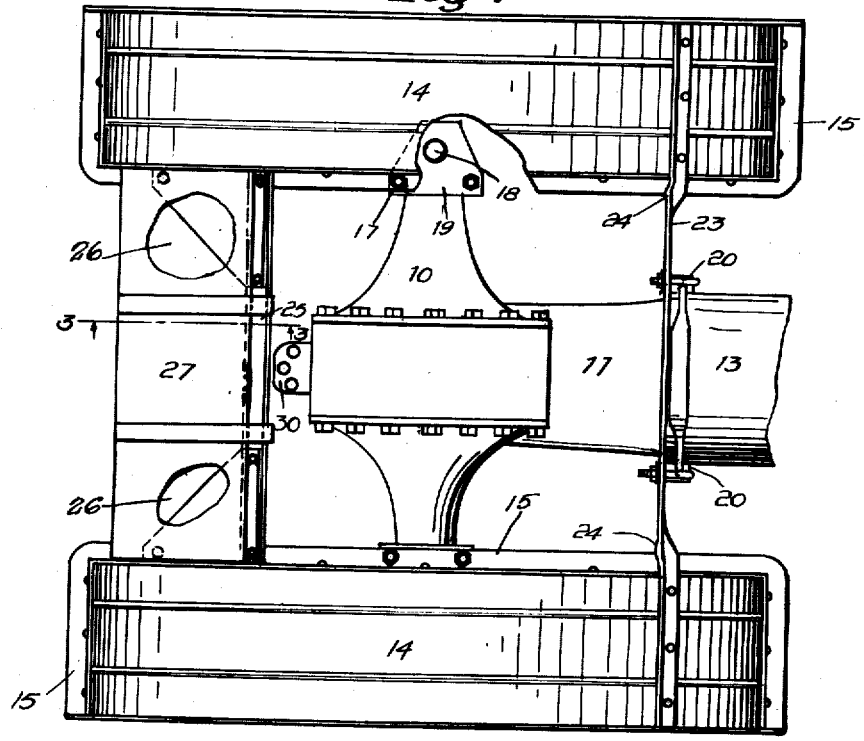
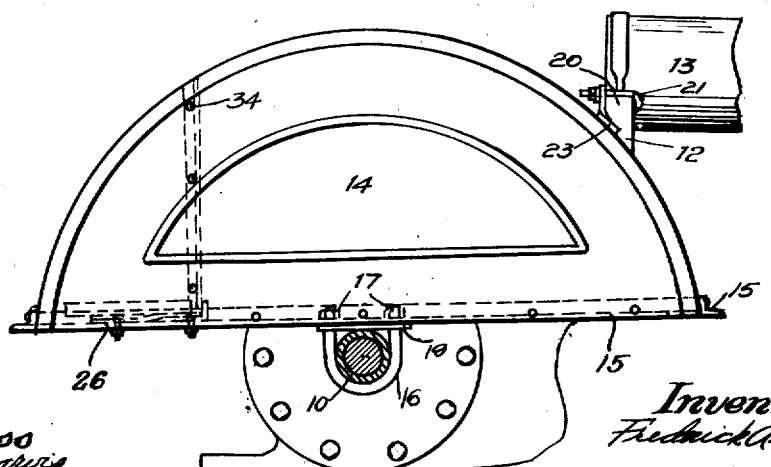
Inventor
Frederick A. Holmes
BY Orwig & Bair ATTYS
Witness

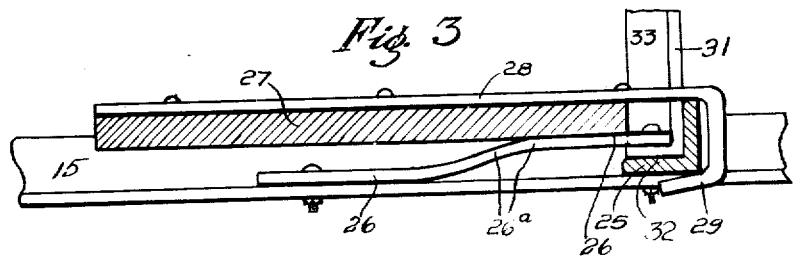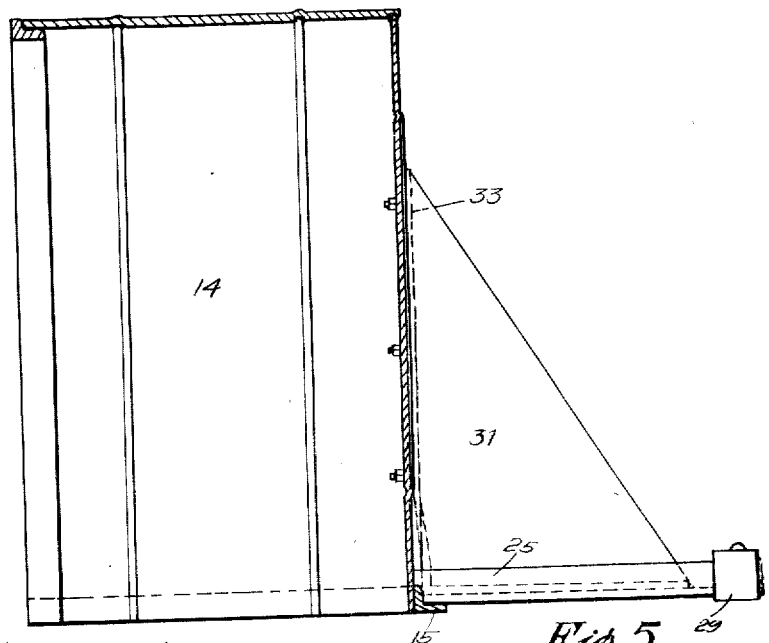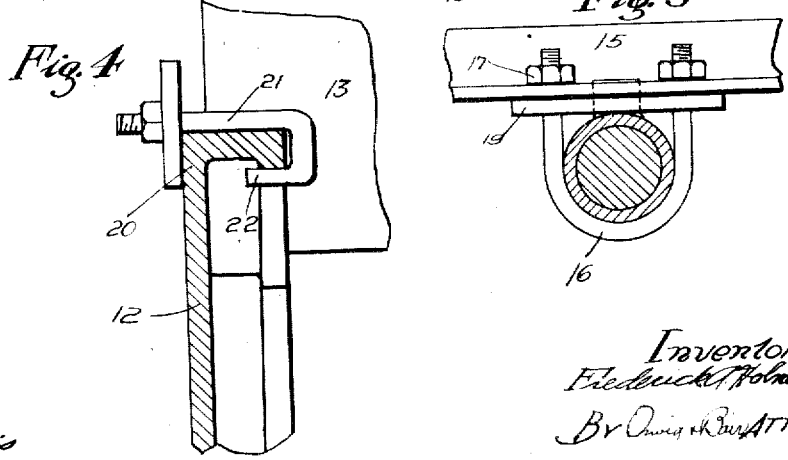

UNITED STATES PATENT OFFICE.

FREDERICK A. HOLMES, OF DALLAS CENTER, IOWA.

TRACTOR FENDER.

1,405,216.   Specification of Letters Patent.   Patented Jan. 31, 1922.

Application filed April 3, 1919. Serial No. 287,204.

*To all whom it may concern:*

Be it known that I, FREDERICK A. HOLMES, a citizen of the United States, and resident of Dallas Center, in the county of Dallas and State of Iowa, have invented a certain new and useful Tractor Fender, of which the following is a specification.

The object of my invention is to provide a tractor fender of simple, durable and inexpensive construction.

More particularly it is my object to provide a fender which may be readily attached to or detached from a tractor to cover the rear wheels and to perform the usual functions of a fender.

A further object of my invention is to provide rigid brace members to connect the fenders at either side of the machine together to thereby add to the rigidity of the fenders and strengthen the fastening devices by which the fenders are attached to the tractor.

Still a further object of my invention is to so arrange the parts of my improved fenders that they may be readily attached to tractors now in use, the various parts being interchangeable, whereby the amount of work in installing will be relatively simple.

Still a further object of my invention is to provide a step extended between the fenders and arranged to be detachably mounted, whereby it may be removed when desired.

With these and other objects in view, my invention consists in the construction, arrangement and combination of the various parts of the device, whereby the objects contemplated are attained, as hereinafter more fully set forth, pointed out in my claim, and illustrated in the accompanying drawings, in which:

Figure 1 shows a top or plan view of a portion of a tractor having mounted thereon a pair of my improved fenders.

Figure 2 shows a side elevation of the parts shown in Figure 1.

Figure 3 shows a vertical sectional view taken on the line 3—3 of Figure 1.

Figure 4 shows a vertical sectional view illustrating in detail the method of fastening one of the fender braces to the tractor.

Figure 5 shows a side elevation of another of the fastening devices; the axle and housing therefor being shown in section and Figure 6 shows a vertical sectional view taken through one of the fenders.

Referring to the drawings, I have used the reference numeral 10 to indicate the housing surrounding the driving mechanism of a tractor, and the reference numeral 11 to indicate the transmission casing extending forwardly therefrom and which supports a dash 12. Carried by the dash 12 is a tank member 13. These parts are of well-known construction and in use on tractors which are now on the market, and form no part of my invention.

My improved fenders consist of a fender member 14 substantially semi-circular in cross-section, and provided with vertical walls at their inner sides. The lower edge of the fender is provided with an angle iron bar 15, which has its ends bent so that it will extend around the fender and reinforce the lower edge, with the vertical portion of the angle iron adjacent to the walls of the fender member.

Near the center of the angle iron 15 are a pair of spaced openings designed to receive a U-bolt 16, which is secured thereto by nuts 17 and extends downwardly therefrom around the axle housing 10. Spaced outwardly from the angle iron 15 in the axle housing of certain types of tractors, is an oil hole having an upwardly extending plug 18 projecting therefrom. A plate 19 is provided with a pair of spaced openings designed to be aligned with the openings in the angle iron 15, and with a third opening adapted to closely receive the plug 18 when the first mentioned openings are aligned.

From the description of the foregoing parts it will be seen that when the U-bolt 16 has passed around the axle housing 10, the plate 19 placed in position with the proper opening over the plug 18 and the other openings receiving the U-bolt 16, which is also passed through the openings in the angle iron 15, the nuts 17 may be then tightened on the U-bolt to thereby engage the angle iron 15 to the axle housing 10 to prevent longitudinal or rotary movement relative thereto.

In the form of tractor for which my improved fender is especially designed, the dash 12 is provided with a vertical web having flanges extending therefrom at each edge. The upper edge of the dash is curved to receive the curved lower surface of the tank 13, so that spaced shoulders 20 are formed at the outside upper edges thereof. On account of the flanged construction of the edges of the dash, these shoulders form a three-sided receptacle in which a bolt 21 having a hooked end 22 may be closely received.

A cross brace 23 is bolted to the upper surfaces of the fenders at either end adjacent to the dash 12, and is provided with openings designed to receive the bolts 21. On account of the curved upper surface of the fenders, it will be noted that the brace 23 is curved as at 24, so that the portion adjacent to the fenders may lie flat upon the fenders, while the portion adjacent to the dash 12 may lie flat against the dash.

From the arrangement of the parts just described, it will be seen that the members 23 may be readily attached to or detached from the dash 12 of the tractor, and rendered immovable relative thereto, whereby the fenders may be further held from any tendency to swing on the U-bolt 16 and axle housing 10 on either a vertical or horizontal axis.

Somewhat forward of the rear end of the fenders, and preferably about half way between the axle housing 10 and the rear end of the fenders, an angle iron 25 is extended across between the angle irons 15. A substantially triangular plate 26 having its surface bent near its center at 26ª is provided with openings adjacent to each corner, designed to receive bolts or rivets which extend through the angle irons 25 and 15, whereby a truss brace may be formed to prevent swinging of the angle irons 15 relative to the angle iron 25.

Extended between the angle irons 15, somewhat rearwardly of the angle iron 25, is a board or step member 27, which is removably secured in place in the following manner.

The board 27 is provided with spaced transverse straps 28 having at their forward ends hook members 29 of sufficient width to engage the angle iron 25. The length, however, of the in-turned hook member 29 is less than the distance from the forward edge of the board 27 to the vertical web of the hook by at least the thickness of the angle iron 25. By reason of this construction it will be seen that the board 27 may be of such length as to be closely received between the angle irons 15 and to rest upon the horizontal web thereof, and may be held from longitudinal sliding by means of the hooks 29.

When, however, it is desired to detach the board 27, it may be moved forwardly sufficiently to disengage the hook member 29 from the angle iron 25 so that the board may be lifted upwardly.

A substantially triangular plate 31 is provided with extensions 32 and 33 on two of its edges, and the extension 32 is provided with openings whereby it may be received between the plate 26 and the angle iron 25.

The bending of the plate 26 at 26ª will permit it to lie flat upon the extension 32 and upon the angle iron 15. Bolts 34 are provided for holding the flange 33 to the side of the fender.

It will be seen that by this construction a truss connection is formed between the vertical wall of the fender and the horizontal angle iron 25, to prevent the fender from swinging on a horizontal axis away from the angle iron 25. The plates 26 and 31 together form trusses which prevent movement of the fender relative to the angle iron 25 on either a horizontal or vertical axis, thereby adding substantially to the rigidity of the structure when installed upon the tractor and at the same time forming brace members which may be readily removed when it is desired to disassemble the fenders and cross braces to ship them in a more convenient form.

In the practical operation of my improved device, the fenders with their braces are assembled as shown in Figure 1, and then may be installed upon the tractor by placing the U-bolt 16 around the tractor axle with the opening in the plate 19 receiving the oil plug 18. The cross brace 23 may then be attached by means of the hook bolts 21. I preferably arrange the parts of my improved fender so that the rear end is swung downwardly somewhat, so that while the fenders are substantially semi-circular in vertical cross-section the greatest possible protection may be given at the top and rear sides of the wheels where the protection is most needed. This construction also does not have so much tendency to interfere with any bull-wheel connection which may be made to the engine of the tractor for driving machinery other than the tractor itself.

It will be noted that in order to install my improved device upon a tractor it is only necessary to screw up six nuts. No holes have to be bored into the tractor, nor do any of the tractor parts have to be disturbed in any way.

I know that fenders have been made before this which could be attached to tractors, but I do not know of any which could be attached to the tractor without either altering the tractor or removing or replacing some of its parts.

I have also provided the removable step 27 which may be almost instantly removed from its position when it is in the way, but which presents as rigid a support when in place as do the fenders themselves.

Some changes may be made in the construction and arrangement of the various parts of my device, without departing from the essential features and purposes of my invention, and it is my intention to cover by my claim any modified forms of structure or use of mechanical equivalents which may be reasonably included within their scope.

I claim as my invention:

In a device of the class described, adapted for attachment to a tractor having a transverse axle housing and a dash adjacent thereto, a pair of fenders, an angle iron secured to the bottom edges of each fender and forming a frame therefor, said angle irons having a pair of spaced openings intermediate of their ends, a plate having openings therein aligned with the openings in the angle iron, and a third opening adapted to register with any rigid projections from the axle housing, slightly flexible U-bolts adapted to receive the axle housing and to be received in said openings, whereby the fender may be engaged to prevent longitudinal and rotary movement relative to the axle housing, a brace extended between the fenders adjacent to the dash, and means for clamping the brace to the dash.

Des Moines, Iowa, March 11, 1919.

FREDERICK A. HOLMES.